(12) United States Patent
Pattavina et al.

(10) Patent No.: US 8,189,553 B2
(45) Date of Patent: May 29, 2012

(54) METHOD AND SYSTEM FOR ENCAPSULATING TIME DIVISION MULTIPLEX DATA INTO INDIVIDUAL PACKETS OF A PACKET BASED NETWORK

(75) Inventors: Jeffrey S. Pattavina, Middletown, CT (US); Junius A. Kim, Stow, MA (US)

(73) Assignee: Harris Corporation, Melbourne, FL (US)

( * ) Notice: Subject to any disclaimer, the term of this patent is extended or adjusted under 35 U.S.C. 154(b) by 1050 days.

(21) Appl. No.: 11/803,300

(22) Filed: May 14, 2007

(65) Prior Publication Data
US 2007/0248073 A1    Oct. 25, 2007

Related U.S. Application Data

(62) Division of application No. 10/153,265, filed on May 22, 2002, now Pat. No. 7,233,587.

(60) Provisional application No. 60/353,615, filed on Feb. 1, 2002.

(51) Int. Cl.
  *H04L 12/66* (2006.01)
  *H04J 3/16* (2006.01)
  *H04J 3/22* (2006.01)
  *G06F 15/173* (2006.01)

(52) U.S. Cl. ......... 370/345; 370/352; 370/471; 709/238

(58) Field of Classification Search .......... 370/345–356, 370/389–535; 379/204–229; 709/238–241
See application file for complete search history.

(56) References Cited

U.S. PATENT DOCUMENTS

| | | | | |
|---|---|---|---|---|
| 4,549,291 A | * | 10/1985 | Renoulin et al. | 370/452 |
| 4,782,485 A | | 11/1988 | Gollub | 370/118 |
| 5,115,431 A | | 5/1992 | Williams et al. | 370/94.1 |
| 5,170,395 A | * | 12/1992 | Shinmyo | 370/347 |
| 5,228,029 A | * | 7/1993 | Kotzin | 370/331 |
| 5,457,691 A | * | 10/1995 | Romeijn | 370/510 |
| 5,848,070 A | * | 12/1998 | Durvaux et al. | 370/442 |

(Continued)

FOREIGN PATENT DOCUMENTS

EP    0 952 710    10/1999

(Continued)

OTHER PUBLICATIONS

Rosenberg J., et al. "An RTP Payload Format for User Multiplexing" IETF AVT Working Group, May 6, 1998, XP002127739.

(Continued)

*Primary Examiner* — M. Phan
(74) *Attorney, Agent, or Firm* — Greenberg Traurig, LLP; David J. Dkyeman; Wayne V. Harper

(57) ABSTRACT

A method of encapsulating TDM data into individual data packets for transmission across a packet network includes delineating the TDM data into one or more signaling multiframes, wherein each signaling multiframe includes one period of a periodic signaling pattern. The method also includes appending a header that is associated with the individual data packets to each of the signaling multiframes of TDM data. Further, a method of selecting the number of multiframes of TDM data in the data packet includes calculating the efficiency of the data packet as a function of the number of multiframes, and selecting the number of multiframes so that the efficiency of the data packet increases exponentially as a number of time-slots in the TDM data increases.

20 Claims, 12 Drawing Sheets

U.S. PATENT DOCUMENTS

| | | | |
|---|---|---|---|
| 6,018,525 A | 1/2000 | Sucharczuk | 370/394 |
| 6,026,086 A | 2/2000 | Lancelot et al. | 370/353 |
| 6,151,325 A | 11/2000 | Hluchyj | 370/398 |
| 6,272,128 B1 * | 8/2001 | Pierson, Jr. | 370/352 |
| 6,304,574 B1 | 10/2001 | Schoo et al. | 370/401 |
| 6,434,166 B1 * | 8/2002 | Buckland et al. | 370/468 |
| 6,459,708 B1 | 10/2002 | Cox et al. | 370/537 |
| 6,490,294 B1 | 12/2002 | Manzado et al. | 370/465 |
| 6,498,794 B1 * | 12/2002 | Tsukamoto et al. | 370/395.1 |
| 6,650,650 B1 * | 11/2003 | Schneider et al. | 370/412 |
| 6,728,272 B1 * | 4/2004 | Hosein | 370/539 |
| 6,804,251 B1 * | 10/2004 | Limb et al. | 370/444 |
| 6,898,213 B1 * | 5/2005 | Shimelmitz et al. | 370/537 |
| 6,959,008 B2 * | 10/2005 | McClary et al. | 370/474 |
| 6,963,561 B1 * | 11/2005 | Lahat | 370/356 |
| 6,999,450 B2 | 2/2006 | Rumer | 370/356 |
| 7,133,415 B2 | 11/2006 | Zelig et al. | 370/466 |
| 7,327,758 B2 * | 2/2008 | Kumar et al. | 370/471 |
| 2002/0159438 A1 * | 10/2002 | Rumer | 370/352 |
| 2003/0012188 A1 * | 1/2003 | Zelig et al. | 370/389 |
| 2005/0169242 A1 * | 8/2005 | Howell | 370/351 |

FOREIGN PATENT DOCUMENTS

| | | |
|---|---|---|
| EP | 1 026 848 | 8/2000 |
| EP | 1 134 944 | 9/2001 |
| WO | WO 01/47198 | 6/2001 |
| WO | WO 01/95057 | 12/2001 |

OTHER PUBLICATIONS

Supplemental European Search Report based on EP 03707613 dated Jun. 2, 2008.

* cited by examiner

| n | E1 = 0.9 | | E1 = 0.8 | | E1 = 0.7 | |
|---|---|---|---|---|---|---|
| | k | EF | k | EF | k | EF |
| 1 | 25 | 0.900901 | 11 | 0.8 | 7 | 0.717949 |
| 2 | 14 | 0.910569 | 8 | 0.853333 | 6 | 0.813559 |
| 3 | 10 | 0.916031 | 7 | 0.884211 | 5 | 0.84507 |
| 4 | 8 | 0.920863 | 6 | 0.897196 | 5 | 0.879121 |
| 5 | 6 | 0.916031 | 6 | 0.916031 | 5 | 0.900901 |
| 6 | 6 | 0.929032 | 5 | 0.916031 | 5 | 0.916031 |
| 7 | 5 | 0.927152 | 5 | 0.927152 | 4 | 0.910569 |
| 8 | 4 | 0.920863 | 4 | 0.920863 | 4 | 0.920863 |
| 9 | 4 | 0.929032 | 4 | 0.929032 | 4 | 0.929032 |
| 10 | 4 | 0.935673 | 4 | 0.935673 | 4 | 0.935673 |
| 11 | 3 | 0.923077 | 3 | 0.923077 | 3 | 0.923077 |
| 12 | 3 | 0.929032 | 3 | 0.929032 | 3 | 0.929032 |
| 13 | 3 | 0.934132 | 3 | 0.934132 | 3 | 0.934132 |
| 14 | 3 | 0.938547 | 3 | 0.938547 | 3 | 0.938547 |
| 15 | 3 | 0.942408 | 3 | 0.942408 | 3 | 0.942408 |
| 16 | 2 | 0.920863 | 2 | 0.920863 | 2 | 0.920863 |
| 17 | 2 | 0.92517 | 2 | 0.92517 | 2 | 0.92517 |
| 18 | 2 | 0.929032 | 2 | 0.929032 | 2 | 0.929032 |
| 19 | 2 | 0.932515 | 2 | 0.932515 | 2 | 0.932515 |
| 20 | 2 | 0.935673 | 2 | 0.935673 | 2 | 0.935673 |
| 21 | 2 | 0.938547 | 2 | 0.938547 | 2 | 0.938547 |
| 22 | 2 | 0.941176 | 2 | 0.941176 | 2 | 0.941176 |
| 23 | 2 | 0.94359 | 2 | 0.94359 | 2 | 0.94359 |
| 24 | 2 | 0.945813 | 2 | 0.945813 | 2 | 0.945813 |
| 25 | 2 | 0.947867 | 2 | 0.947867 | 2 | 0.947867 |
| 26 | 2 | 0.949772 | 2 | 0.949772 | 2 | 0.949772 |
| 27 | 2 | 0.951542 | 2 | 0.951542 | 2 | 0.951542 |
| 28 | 2 | 0.953191 | 2 | 0.953191 | 2 | 0.953191 |
| 29 | 2 | 0.954733 | 2 | 0.954733 | 2 | 0.954733 |
| 30 | 2 | 0.956175 | 2 | 0.956175 | 2 | 0.956175 |
| 31 | 1 | 0.918519 | 1 | 0.918519 | 1 | 0.918519 |

FIG. 10

METHOD AND SYSTEM FOR ENCAPSULATING TIME DIVISION MULTIPLEX DATA INTO INDIVIDUAL PACKETS OF A PACKET BASED NETWORK

CROSS-REFERENCE TO RELATED APPLICATIONS

This application is related to the following U.S. applications, of common assignee, from which priority is claimed, and the contents of which are incorporated herein in their entirety by reference:

This application is a divisional of U.S. application Ser. No. 10/153,265, filed May 22, 2002, now U.S. Pat. No. 7,233,587, which claims priority to "Method And System For Encapsulating Time Division Multiplex Data Into Real Time Protocol Packets For Transport," U.S. Provisional Patent Application Ser. No. 60/353,615, filed Feb. 1, 2002.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to digital communications, and more particularly, to methods and systems for transporting time division multiplex (TDM) data via packet-based networks.

TDM data may consist of Constant Bit Rate (CBR) data as well as non-CBR data. CBR data includes real-time data such as voice, video or professional, studio quality (i.e., program) audio. Typically, constant bit rate (CBR) data is formatted into 64 kbps time-slots (TS) and TDM techniques are used to map the time-slots into T1 or E1 frames which are transported over the Public Switched Telephone Network (PSTN).

In one "real world" example of CBR data, the program audio produced in a studio must be relayed to a remote transmitter site for subsequent broadcast. In some cases, a studio-to-transmitter link (hereinafter referred to as STL) may be implemented with a T1 (or E1) digital circuit via the PSTN. In prior art, this digital circuit is typically implemented using expensive "nailed up" (i.e., dedicated) T1 lines. One way to reduce the cost of such an STL is to relay the professional quality audio data over an existing, general purpose packet based network such as the Internet. Other formats of CBR data that would normally be transmitted via a dedicated TI line (e.g., MPEG, APT-X, Linear etc.) also could be advantageously transported via a packet based network. A unique "convergence layer," i.e., a set of rules that defines how to encapsulate the T1/E1 data into the individual packets of the packet based network, must be specifically designed for each particular media type. Thus, each individual convergence layer is media-specific. Further, more generic types of data, such as voice, video, synchronous data, asynchronous data, etc., could also benefit by being transported over packet networks.

A disadvantage of prior art systems for encapsulating T1 or E1 TDM-based data into a packet based communications protocol is the requirement for unique convergence layers for each data type. Further, prior art techniques for encapsulating T1 or E1 data into a packet based protocol typically encapsulate all of the T1 overhead bits, as well as the payload data, which reduces the overall bandwidth efficiency.

SUMMARY OF THE INVENTION

In one aspect, the invention comprises a method of encapsulating TDM data into individual data packets for transmission across a packet network. The method includes delineating the TDM data into one or more signaling multiframes, wherein each signaling multiframe includes one period of a periodic signaling pattern. The method further includes appending a header that is associated with the individual data packets to each of the signaling multiframes of TDM data.

An embodiment of the method further includes delineating the TDM data such that a first byte in the one or more signaling multiframes is directly adjacent to the header.

Another embodiment of the method further includes appending an RTP header to each of the signaling multiframes.

Another embodiment of the method further includes appending a modified RTP header to each of the signaling multiframes.

Another embodiment of the method further includes extracting the TDM data from one or more time-slots from a TDM data stream.

Another aspect of the invention comprises a data packet constructed and arranged to encapsulate TDM data for transmission over a packet network. The data packet includes a segment of the TDM data from one or more TDM time-slots. The segment of the TDM data corresponds to a signaling multiframe of the TDM data that includes one period of a periodic signaling pattern. The data packet further includes a header associated with the individual data packets appended to the segment of the TDM data.

In another embodiment of the data packet, the TDM data includes T1 data.

In another embodiment of the data packet, the TDM data includes E1 data.

In another embodiment of the data packet, the segment of TDM data is delineated such that a first byte in the signaling multiframe is directly adjacent to the header. The header may include an RTP header. Further, the RTP header may include an extended RTP header that contains data associated with (i) the starting time-slot, (ii) the number of time-slots per frame, and (iii) the number of multiframes in the data packet.

In another embodiment of the data packet, the signaling multiframe corresponds to a multiframe associated with the TDM data. The multiframe may includes 16 frames for E1 data, or the multiframe may include 24 frames for T1 data.

Another aspect of the invention comprises a method of selecting a value of a parameter k, wherein the parameter k represents a number of multiframes of TDM data in a data packet for transmission across a packet network, and the packet includes packet payload data and packet overhead data. The method includes calculating one or more values of the parameter k as a function of one or more input parameters. Each value of k corresponds to n, a number of time-slots in the TDM data, such that the efficiency of the data packet increases exponentially as the number of time-slots in the TDM data increases. The method further includes selecting a value of the parameter k corresponding to the input parameters associated with the payload data and the overhead data.

In another embodiment, the method further includes calculating the parameter k such that $$k = \text{Ceiling}\left[\dfrac{-OH\left(\begin{array}{c}-MN_{mx}e^{1/\tau}+MN_{mx}e^{n/\tau}+\\ EF_1 MN_{mx}e^{1/\tau}+EF_1 OHe^{1/\tau}\end{array}\right)}{nM\left(\begin{array}{c}-MN_{mx}e^{1/\tau}+EF_1 MN_{mx}e^{1/\tau}-\\ OHe^{n/\tau}+EF_1 OHe^{1/\tau}\end{array}\right)}\right],$$

wherein

OH represents an amount of packet overhead data;

M represents an amount of frames in a signaling multiframe of the TDM data;

$N_{mx}$ represents a maximum amount of times slots per frame associated with the TDM data;

$\tau$ represents a time constant;

n represents an amount of time-slots associated with the TDM data;

$EF_1$ represents a minimum allowed efficiency of the data packet;

and Ceiling[ ] represents a function for limiting the parameter k to an integer value.

In another embodiment, the method further includes delineating the TDM data such that a first byte in the one or more signaling multiframes is directly adjacent to the header.

In another embodiment, the method further includes appending an RTP header to each of the signaling multiframes.

In another embodiment, the method further includes appending a modified RTP header to each of the signaling multiframes.

In another embodiment, the method further includes extracting the TDM data from one or more time-slots from a TDM data stream.

Another aspect of the invention comprises a system for compiling one or more data packets for transmission across a packet network. Each packet includes packet payload data and packet overhead data. A parameter k describes the number of multiframes of TDM data in each data packet, and a parameter n describes a number of time-slots in the TDM data. The system includes a processor for calculating one or more values of the parameter k as a function of one or more input parameters, such that each value of k corresponds to a value of n, and the efficiency of the data packet increases exponentially as n increases. The processor further selects a particular value of the parameter k, corresponding to the input parameters associated with the payload data and the overhead data. The system also includes a packet assembler for receiving data from one or more TDM time-slots, along with the parameter k and one or more of the input parameters, and producing one or more data packets each having k multiframes of TDM data.

In another embodiment, the processor calculates the parameter k such that $$k = \text{Ceiling}\left[\dfrac{-OH\left(\begin{array}{c}-MN_{mx}e^{1/\tau}+MN_{mx}e^{n/\tau}+\\ EF_1 MN_{mx}e^{1/\tau}+EF_1 OHe^{1/\tau}\end{array}\right)}{nM\left(\begin{array}{c}-MN_{mx}e^{1/\tau}+EF_1 MN_{mx}e^{1/\tau}-\\ OHe^{n/\tau}+EF_1 OHe^{1/\tau}\end{array}\right)}\right],$$

the input parameters include OH, M, $N_{mx}$, $\tau$, n, $EF_1$, and

OH represents an amount of packet overhead data;

M represents an amount of frames in a signaling multiframe of the TDM data;

$N_{mx}$ represents a maximum amount of times slots per frame associated with the TDM data;

$\tau$ represents a time constant;

n represents an amount of time-slots associated with the TDM data;

$EF_1$ represents a minimum allowed efficiency of the data packet;

and Ceiling[ ] represents a function for limiting the parameter k to an integer value.

In another embodiment of the system, the TDM data includes T1 data.

In another embodiment of the system, the TDM data includes E1 data.

In another embodiment of the system, the data packet includes a header, and the TDM data is delineated such that a first byte in a signaling multiframe is directly adjacent to the header.

In another embodiment of the system, the header includes an RTP header.

In another embodiment of the system, the RTP header includes an extended RTP header having data associated with (i) starting time-slot, (ii) number of time-slots per frame, and (iii) number of multiframes in the data packet.

In another embodiment of the system, the signaling multiframe corresponds to a multiframe associated with the TDM data In another embodiment of the system, the multiframe includes 16 frames for E1 data.

In another embodiment of the system, the multiframe includes 24 frames for T1 data.

Another embodiment of the system further includes a switch for receiving three inputs: (i) the parameter k from the processor, (ii) a user-defined parameter k, and (iii) a switch control signal. The switch provides, to the packet assembler, either the parameter k from the processor or the user-defined parameter k, depending upon the state of the switch control signal.

BRIEF DESCRIPTION OF DRAWINGS

The various unique features, as well as various inventive embodiments, may be more fully understood from the following description, when read together with the accompanying drawings in which.

DESCRIPTION OF THE PREFERRED EMBODIMENTS

Figure 1:
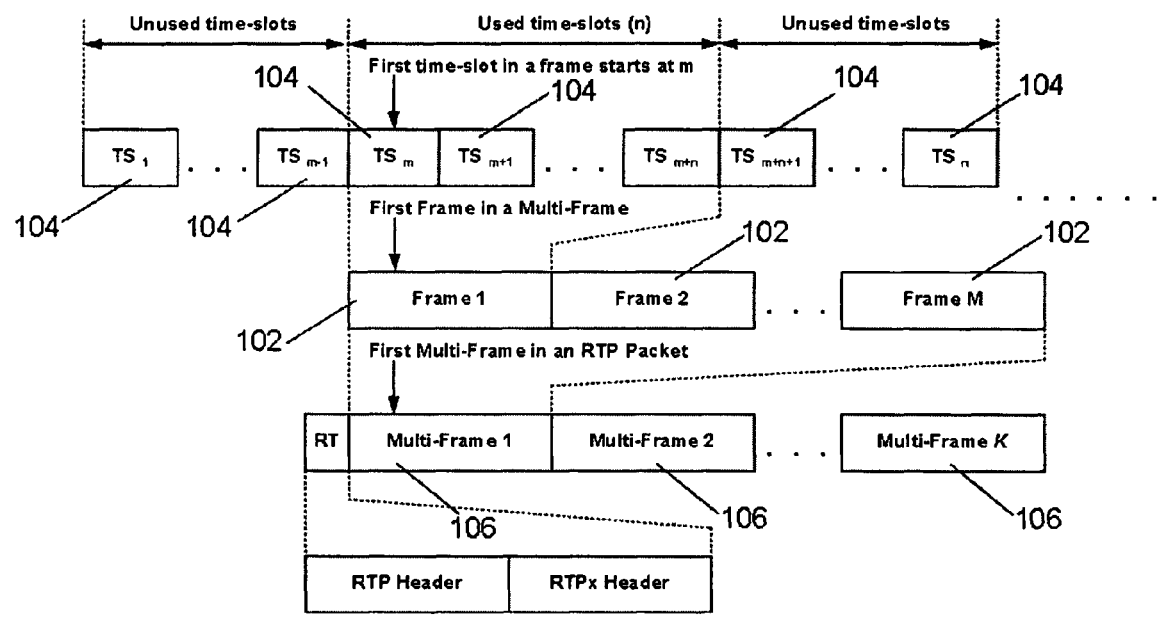
FIG. 1 shows how TDM data is encapsulated into Real Time Protocol packets, according to the present invention.

A method of encapsulating TDM data into individual data packets (also referred to as "the convergence layer"), as described herein, provides a novel way to transport T1 or E1 data via existing packet based networks. Thus, the method described herein is a set of rules that defines how to organize TDM data into the individual packets of a packet based communications protocol. Other classes of TDM data, such as Fractional T1/E1 and N×64K, may also be transported using the method described herein. For the purposes of illustration and example only, the description of the method herein concentrates on the transport of T1 or E1 data (referred to as E1/T1 herein). The underlying concepts taught are also applicable to other data formats. The present method of encapsulating TDM data into individual data packets (i.e., the convergence layer) allows TDM data, for example T1, E1, N×64k, etc., to be encapsulated into Real Time Protocol (referred to herein as "RTP") packets, as shown in FIG. 1. Each frame 102 is distributed among n time-slots 104, and M frames form each multiframe 106. For transporting real-time CBR applications over packet networks, the protocol most often used is RTP, which provides additional end-to-end delivery services needed by upper layer protocols to transport data with real-time characteristics, such as audio, video and voice. Those services include payload type identification; sequence numbering, time stamping and delivery monitoring. The sequence numbers included in RTP allows the receiver to reconstruct the sender's packet sequence.

For IP based networks RTP typically runs on top of UDP to make use of its multiplexing and checksum services. This is denoted by RTP/IP/UDP to indicate the protocol layers involved.

For Frame Relay based networks RTP runs on top of the Frame Relay protocol and is denoted by FR/RTP. It is also possible to encapsulate the RTP/IP/UDP inside the Frame Relay packet, which becomes FR/IP/UDP/RTP.

In addition to the standard headers for IP, UDP and FR we add a four-byte header for the convergence layer. This four-byte header is referred to the RTP extension header (RTPx).

The number of T1/E1 multi-frames in a single RTP packet is given by the parameter k. The value of k can be manually selected or automatically determined by an Exponential Weighting Algorithm (EWA). The EWA is described in more detail herein.

A T1/E1 multiframe (referred to herein as "MF") consists of M frames, where M is equal to 24 for T1 and M is equal to 16 for E1. Each frame consists of n DS0 time-slots, where the value of n can be from 1 to 24 for T1 and 1 to 32 for E1. The parameter n is also referred to herein as the "time-slot utilization." The T1/E1 framing bits are not encapsulated in the RTP packets, and are thus discarded in the convergence layer.

Figure 2:
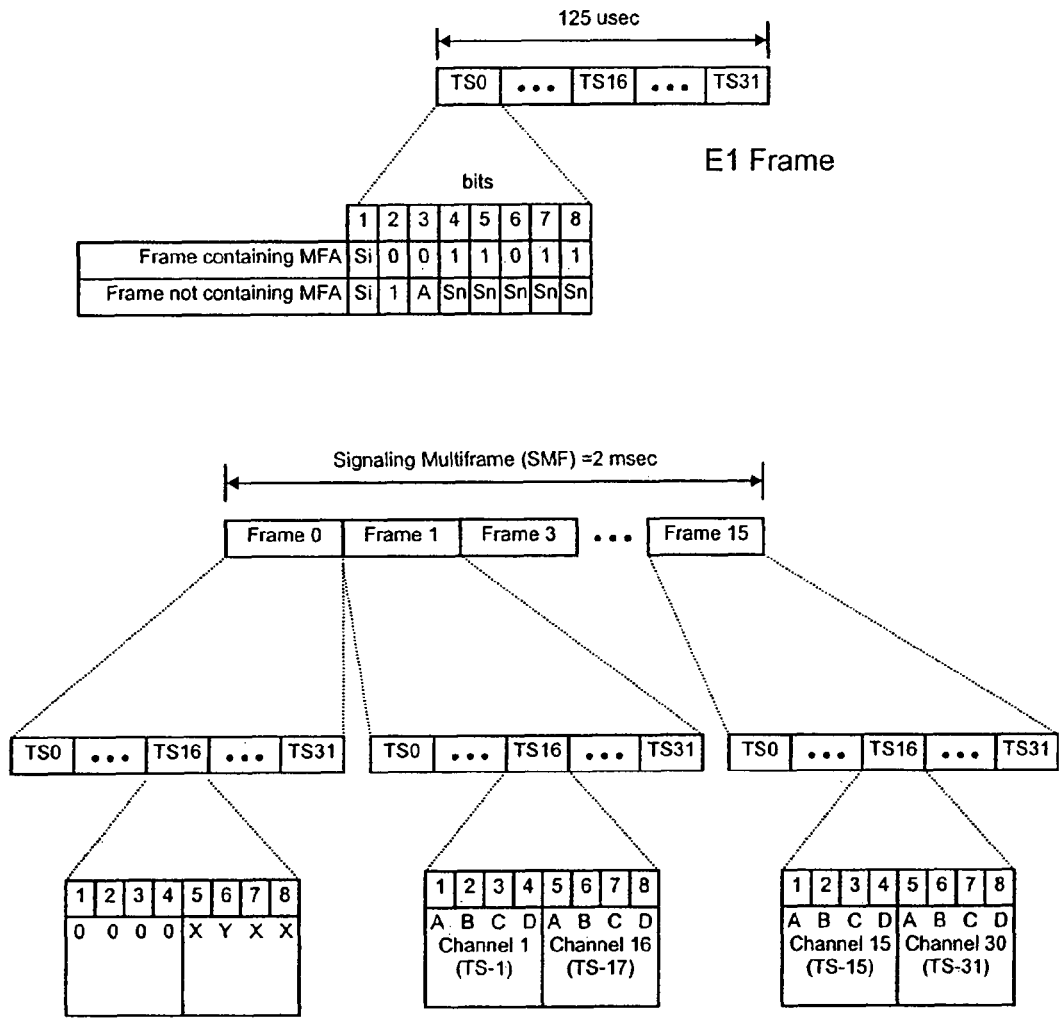
FIG. 2 shows E1 frame configuration as used in the data encapsulation in FIG. 1.
Figure 3A:
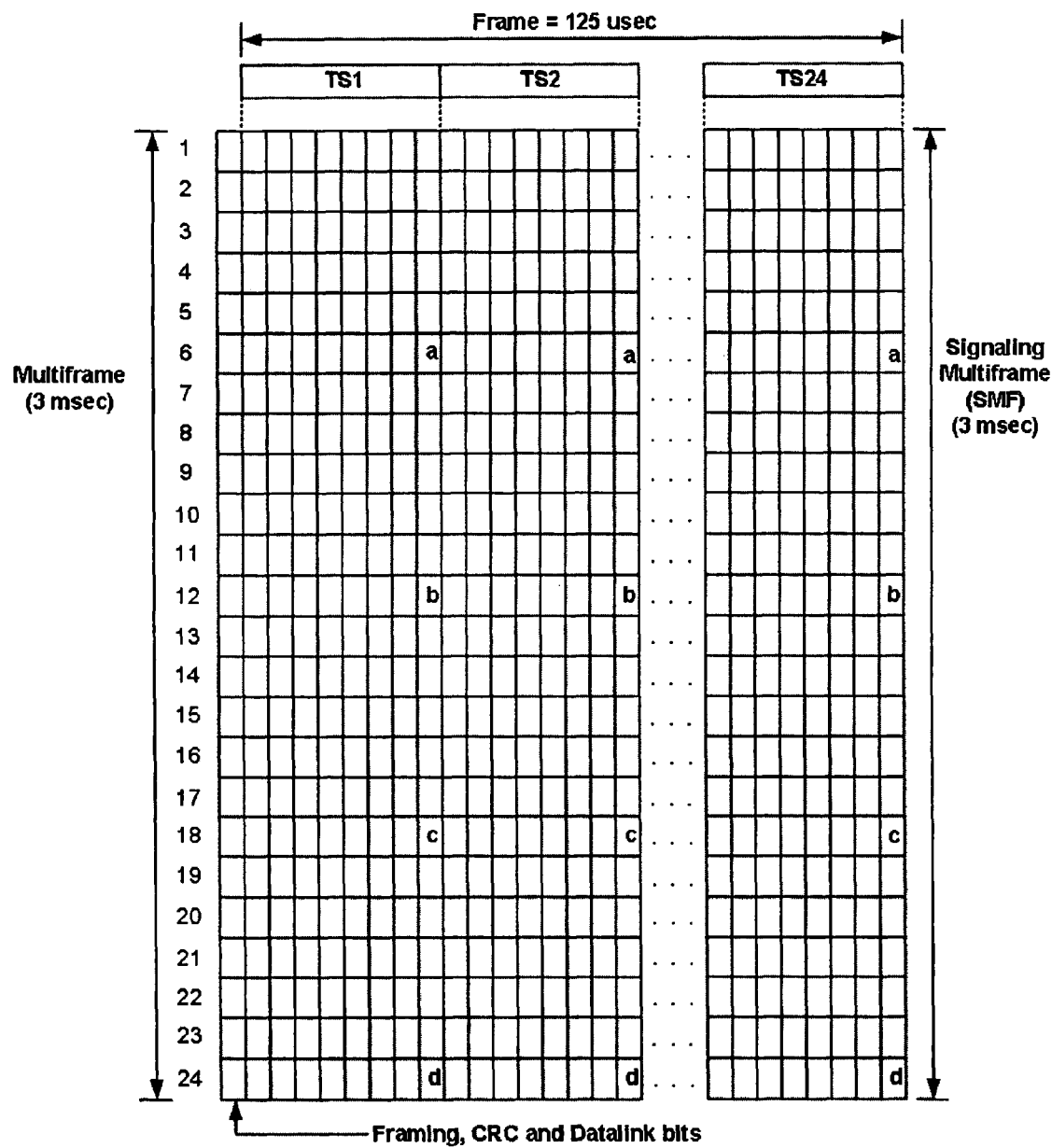
FIG. 3A shows T1 frame configuration (16 state signaling) as used in the data encapsulation in FIG. 1.
Figure 3B:
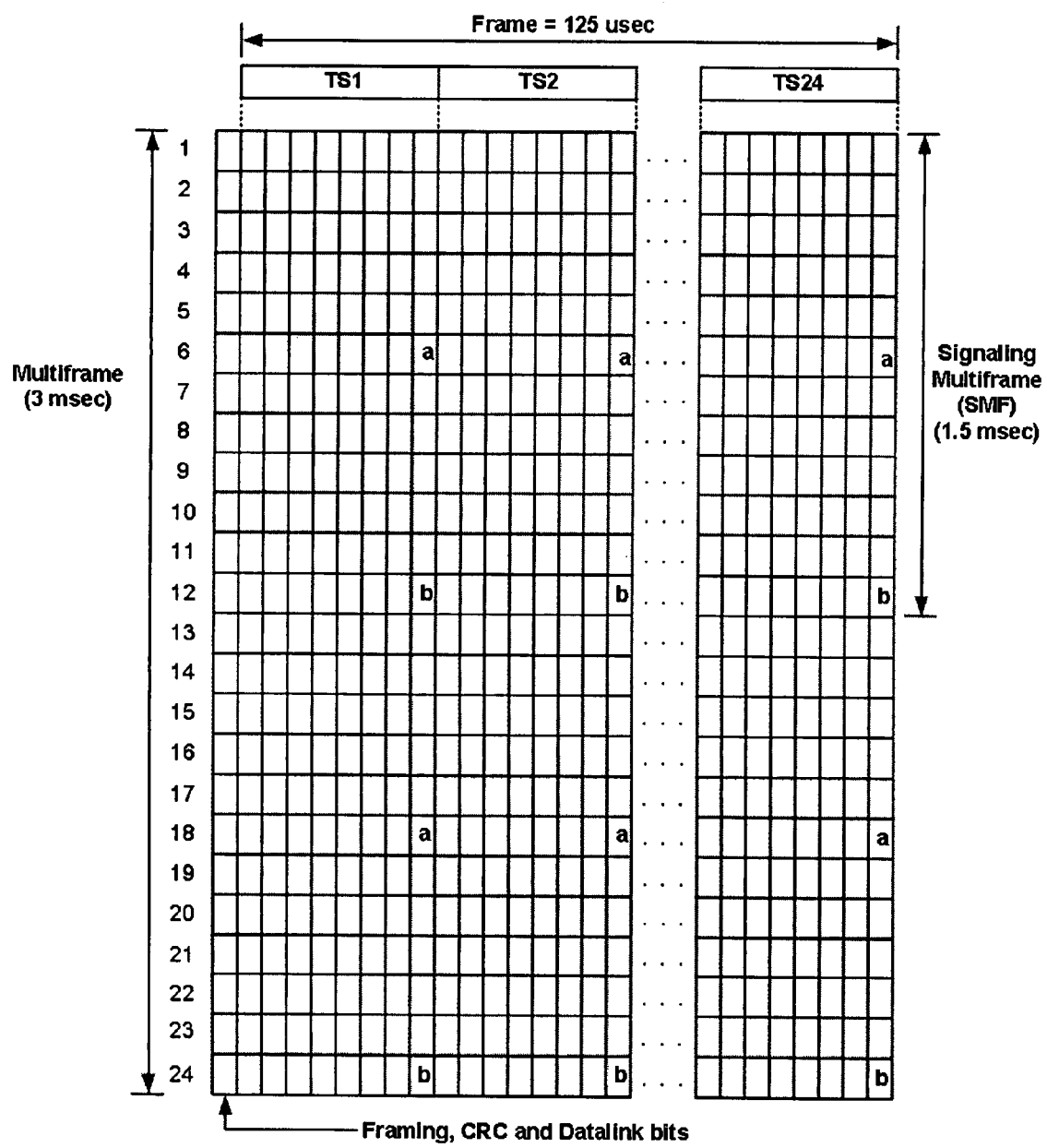
FIG. 3B shows T1 frame configuration (4 state signaling) as used in the data encapsulation in FIG. 1.

Channel Associated Signaling (referred to herein as "CAS"), also known in the art as ABCD or AB signaling, is typically used to implement voice trunking over T1/E1. CAS is essentially a periodic signaling pattern within the E1/T1 data stream. In order to preserve the signaling information after the T1/E1 framing bits are discarded, the convergence layer requires that the first byte following the RTP header must be the first byte in an E1/T1 signaling multiframe (referred to herein as "SMF"). For 16-state signaling the ABCD signaling bits repeat once per multiframe (i.e., every M frames). Therefore the length of the SMF is the same as the length of the T1/E1 multiframe. The SMF for 16-state signaling is 16 frames in length for E1 and 24 frames for T1. The first frame in an SMF for 16-state signaling corresponds to frame-0 for E1 (see FIG. 2) and frame-1 for T1 (see FIG. 3). This positioning of the T1/E1 frames within the SMF allows CAS signaling bits to be identified and extracted at the remote end. The ABCD signaling bits can thus be transported transparently to the upper layers without having to send the T1/E1 framing bits. For 4-state (AB) CAS signaling only two signaling bits are used. The SMF for E1 is the same as for the 16-state case. For T1 however, the AB bits are repeated every M/2 frames. Therefore the SMF is only 12 frames long. The first byte following the RTP header for this case is either the first byte in frame 1 or frame 13. The E1 signaling byte is transported transparently in time-slot 16 (TS-16). For E1, TS-0 is not used. Therefore in one preferred embodiment, TS-16 in the E1 payload is transported in TS-0 of the encapsulated payload. In other embodiments, TS-16 from the E1 payload is conveyed in TS-16 of the encapsulated payload. For T1 the CAS signaling is embedded in the TDM data (LSB) and is transparent to the upper layers. The convergence layer for N×64 has no requirement to maintain multi-frame boundaries, so M (i.e., the length of the SMF) can be any value.

Figure 4:
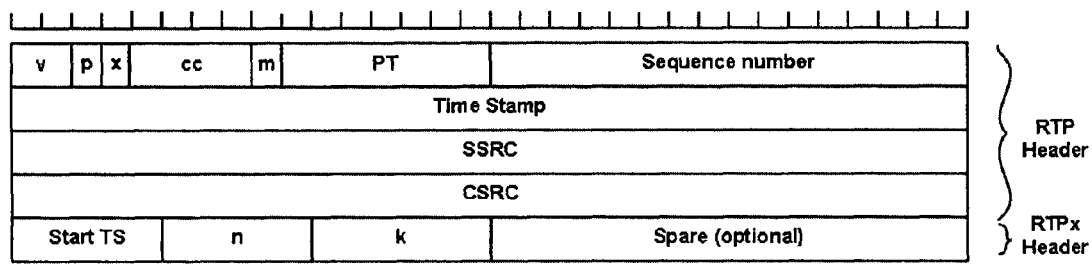
FIG. 4 shows the RTPx header extension as used in the data encapsulation in FIG. 1.

The convergence layer defines a modified RTP header that includes a four-byte extension, denoted by RTPx, as shown in FIG. 4, where the following RTPx fields are defined as follows:

| | | |
|---|---|---|
| a) | Start TS | 5 bits, starting Time-Slot for T1/E1 payload. |
| b) | n | 5 bits, Number of time-slots used in the T1/E1 frame |
| c) | k | 6 bits, Number of multi-frames encapsulated in an RTP packet |
| d) | Spare | 16 bits, Undefined. These are optional and may be used for such things as a user data link or for additional payload type information. |

The convergence layer requires that the IP packet after encapsulation shall be less than or equal to 1500 bytes, which is the Maximum Transmission Unit (MTU) of Ethernet. This is done in order to avoid fragmenting packets resulting in error multiplication.

A number of parameters may be defined associated with the convergence layer described herein. For example:

1) Packet Overhead—this parameter describes the number of bytes in each packet for various communication layers.
   Packet Overhead=20 for IP
   Packet Overhead=8 for UDP
   Packet Overhead=12 for RTP
   Packet Overhead=8 for Frame Relay
   Packet Overhead=4 for RTPx (RTP Extension)

2) OH—this parameter describes the total number of overhead bytes for various combinations of communications layers.
   OH=44 . . . for IP/UDP/RTP/RTPx
   OH=24 . . . for FR//RTP/RTPx 3) n—this parameter describes the number of time-slots per T1/E1 frame.
   n=1 to 31 . . . for E1
   n=1 to 24 . . . for T1

4) M—this parameter describes the number of frames in a Signaling Multiframe.
   M=16 . . . for E1
   M=24 . . . for T1 with 16-state signaling
   M=12 . . . for T1 with 4-state signaling
5) $N_{mx}$—this parameter describes the maximum number of time-slots per frame
   $N_{mx}$=31 . . . for E1
   $N_{mx}$=24 . . . for T1
6) k—this parameter describes the number of Multi-frames in a packet
   Manually select k for k<32
   Automatically select k based on n use weighting factor algorithm
7) $T_{MF}$—this parameter describes the period (duration) of a Signaling Multiframe (SMF)
   $T_{MF}$=2 msec . . . for E1
   $T_{MF}$=3 msec . . . for T1 with 16-state signaling
   $T_{MF}$=1.5 msec . . . for T1 with 4-state signaling
8) PL—this parameter describes the size of the payload in bytes; PL=k n M
9) PKT—this parameter describes the size of each packet in bytes, including overhead and payload.
   PKT=PL+OH
10) EF—this parameter, the Packet Efficiency, describes the ratio of the payload size to the overall size of the packet.
    EF=PL/PKT
11) $T_D$—this parameter, the packet latency, describes the duration of the total number of multiframes in a packet.
    $T_D$=k $T_{MF}$ msec In one embodiment, the number of T1/E1 multiframes in a single RTP packet (i.e., the parameter k) is selected manually, in cases for which the user needs to control or minimize the latency. In this embodiment, the user specifies the time-slot utilization n, and the number of multiframes k to be encapsulated.

In another embodiment, the parameter k is selected automatically by an Exponential Weighting Algorithm (hereinafter referred to as EWA), which optimizes the value of k for high EF and thus high bandwidth efficiency. In general, high bandwidth efficiency is more important for larger n, i.e., for a greater time-slot utilization of the T1/E1 transmission. Increasing the bandwidth efficiency requires increasing the value of k, i.e., increasing the number of multiframes to be encapsulated. An increase in packet latency may be an undesirable consequence of increasing k.

Note that for large values of n (i.e., high time-slot utilization), the value of k does not need to be large for high bandwidth efficiency. For example, given n=31 in an E1 system, a value of k=1 yields an efficiency that is greater than 90% for the IP/UDP case. However, for small values of n, a large value of k may be required to achieve the same 90%, which consequently increases latency. This embodiment uses an algorithm (EWA) to control the percentage of packet overhead (with respect to the total packet) so as to exponentially weight the bandwidth efficiency. For lower values of n, the EWA allows a larger percentage of packet overhead, lowering the packet efficiency EF and thus the bandwidth efficiency. The EWA gradually decreases the percentage of the packet overhead, so as to increase the packet efficiency EF, as n get larger. A "minimum allowed efficiency" may be established by applying a predetermined input parameter, $EF_1$, to the EWA, which occurs at n=1. The user can also specify an exponential time constant τ. The value of τ determines how fast or slow the packet efficiency EF increases. In one embodiment, values for τ range from 1 to 8, although other suitable ranges for τ may also be used. Values of r at or near the low end of the allowable range typically provide faster convergence. Details of the EWA are set forth via the following equations and text.

The payload size (PL) in bytes is the product of the number of multiframes sent (k), the number of frames in each multiframe (M), and the number of DS0 time-slots in each frame (n), i.e., $$PL = knM \tag{1}$$

The packet size PKT in bytes is the sum of the payload size (PL) and the total overhead bytes (OH) in each packet, i.e., $$3PKT = OH + PL \tag{2}$$
$$= knM + OH$$

The efficiency EFF as a function of n is given by the ratio of the payload size (PL) to the overall packet size (PKT), i.e., $$EEF = \frac{PL}{PKT} = \frac{knM}{knM + OH} \tag{3}$$

When the maximum number of DS0 time-slots are utilized (i.e., n=$N_{mx}$), the minimum efficiency E31 occurs for k=1, and (for E1) is given by 5

$$E_{31} = EFF(k \to 1, n \to N_{\max}) \tag{4}$$
$$= \frac{MN_{\max}}{MN_{\max} + OH}$$

A weighted efficiency, EF, is given by the following equation:

$$EF = EF_{31} - (EF_{31} - EF_1)e^{\frac{1-n}{\tau}} \tag{5}$$

Figure 5:
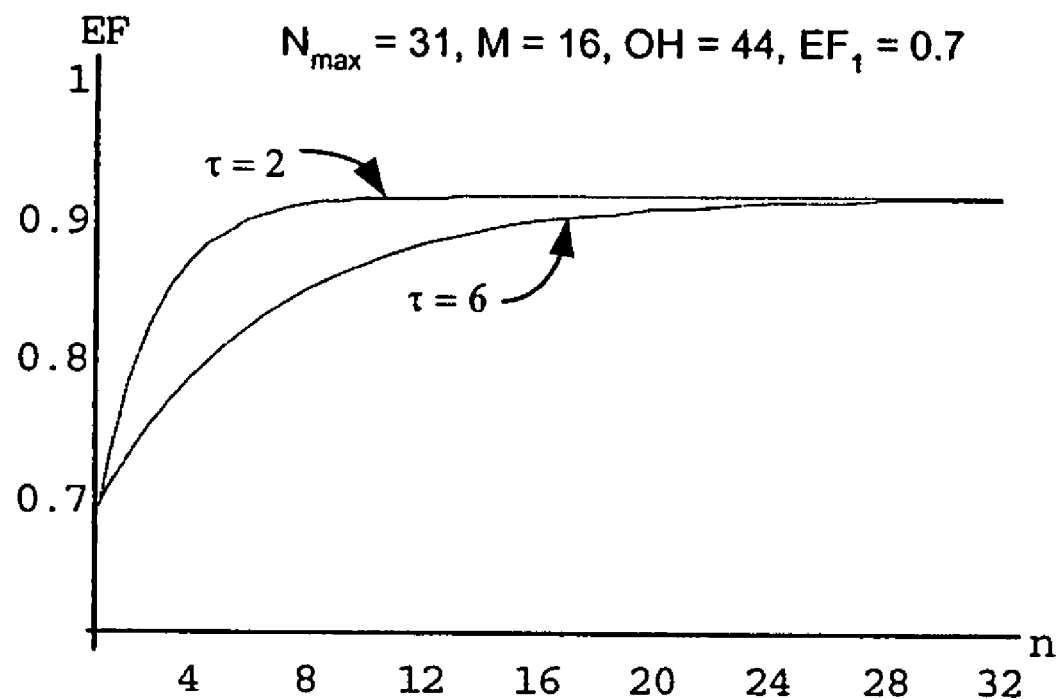
FIG. 5 shows how the efficiency EF varies as a function of n, and how the time constant $\tau$ controls the rate at which the efficiency changes.

The weighted efficiency EF in equation (5) increases exponentially as n approaches $N_{mx}$. The packing of each individual packet is based on the target overhead percentage that produces a minimum efficiency $EF_1$. This algorithm of equation (5) uses an exponential weighting factor, such that the efficiency increases as the number of time-slots n increases, from a minimum of $EF_1$ at n=1, to a maximum of $EF_{31}$ at n=$N_{max}$. FIG. 5 shows how the efficiency EF varies as a function of n, as described by equation (5), and how the time constant τ controls the rate at which the efficiency changes. FIG. 5 shows two curves, one representing τ=2 and one representing τ=6. Although both curves have essentially the same value at the extremes of n (i.e., both begin at $EF_1$=0.7 and have a final efficiency of approximately 0.9), the curve corresponding to τ=2 approaches the 0.9 efficiency level with respect to n than the curve corresponding to τ=6.

The expression for EFF given by equation (3) and the expression for EF given by (5) are both functions of n. Setting the expression for EFF equal to the expression for EF and solving for k yields:

$$\tilde{k} = \frac{-OH\left(\begin{array}{c}-MN_{mx}e^{1/\tau} + MN_{mx}e^{n/\tau} + \\ EF_1 MN_{mx}e^{1/\tau} + EF_1 OHe^{1/\tau}\end{array}\right)}{nM\left(\begin{array}{c}-MN_{mx}e^{1/\tau} + EF_1 MN_{mx}e^{1/\tau} - \\ OHe^{n/\tau} + EF_1 OHe^{1/\tau}\end{array}\right)} \quad (6)$$

A quantizing function (referred to herein as "Ceiling[ ]"), which rounds the argument within the brackets to the nearest integer, is applied to the right side of equation (6). Equation (6) must be quantized because the variable k can only take on integer values. The resulting equation given by equation (7) below is referred to herein as the Exponential Weighting Algorithm (EWA).

$$k = \text{Ceiling}\left[\frac{-OH\left(\begin{array}{c}-MN_{mx}e^{1/\tau} + MN_{mx}e^{n/\tau} + \\ EF_1 MN_{mx}e^{1/\tau} + EF_1 OHe^{1/\tau}\end{array}\right)}{nM\left(\begin{array}{c}-MN_{mx}e^{1/\tau} + EF_1 MN_{mx}e^{1/\tau} - \\ OHe^{n/\tau} + EF_1 OHe^{1/\tau}\end{array}\right)}\right], \quad (6)$$

Using the value of k calculated from equation (7), the delay (i.e., the latency) can be calculated as follows:

$$T_D = kT_{MF} \quad (8)$$

Figure 6:
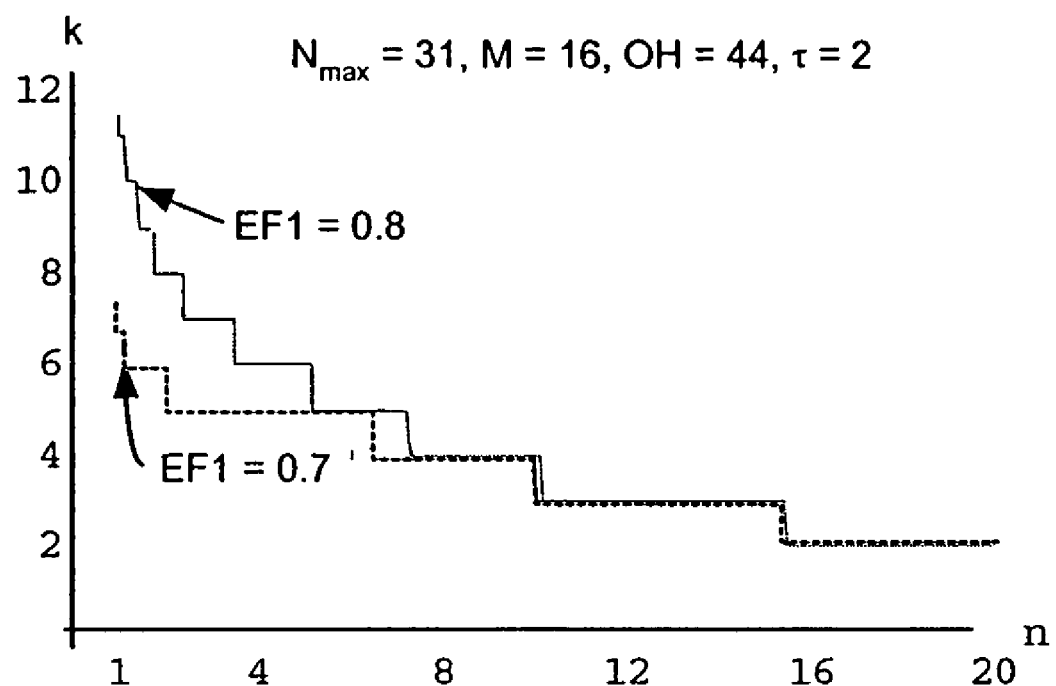
FIG. 6 shows k, the number of multiframes encapsulated in an RTP packet according to the present invention, plotted as a function of n.

FIG. 6 shows k from equation (7) plotted as a function of n. The parameters used in this example (i.e., $N_{max}$=31, M=16, OH=44, and $\tau$=2) are for E1 over IP/UDP/RTP, for efficiencies of EF=0.7 and 0.8.

Figure 7:
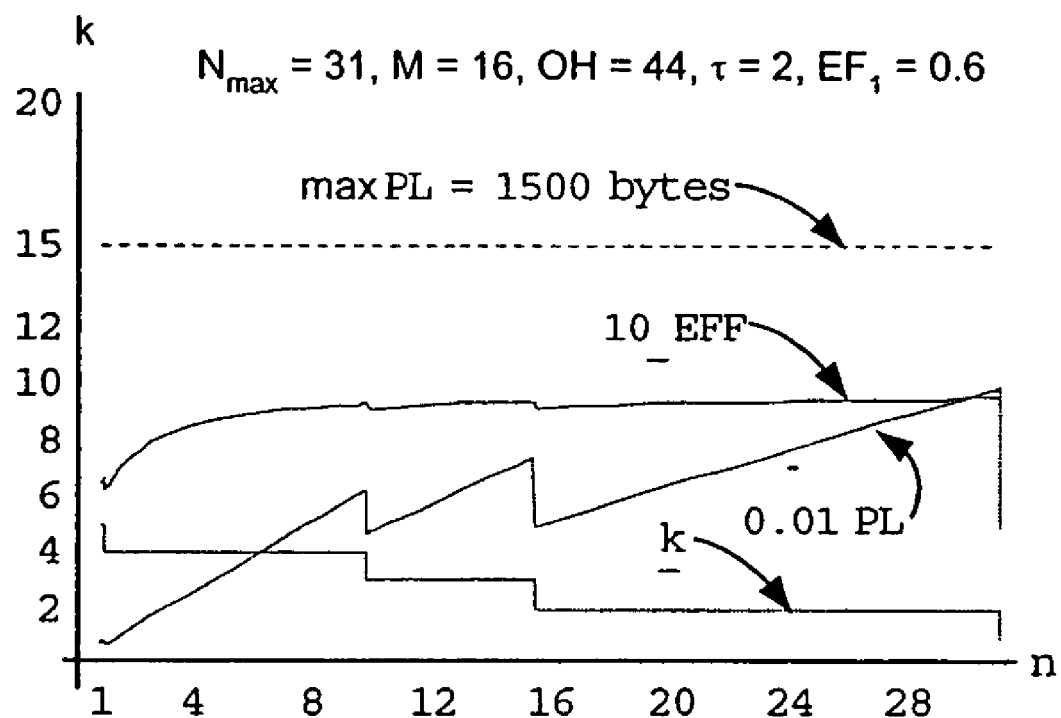
FIG. 7 plots k of FIG. 6 along with several other associated parameters.

FIG. 7 plots k, PL and EFF vs. n, as derived from equation (7). Some of the parameters were scaled in order to plot them all on the same graph. The payload PL is scaled down by a factor of 100 and the efficiency EFF is scaled up by a factor of 10. Thus, FIG. 7 plots k, PL/100 and 10 EFF for EF1 of 60%. FIG. 7 shows that the payload PL is below an upper target limit (i.e., max PL) of 1500 bytes.

Figure 8:
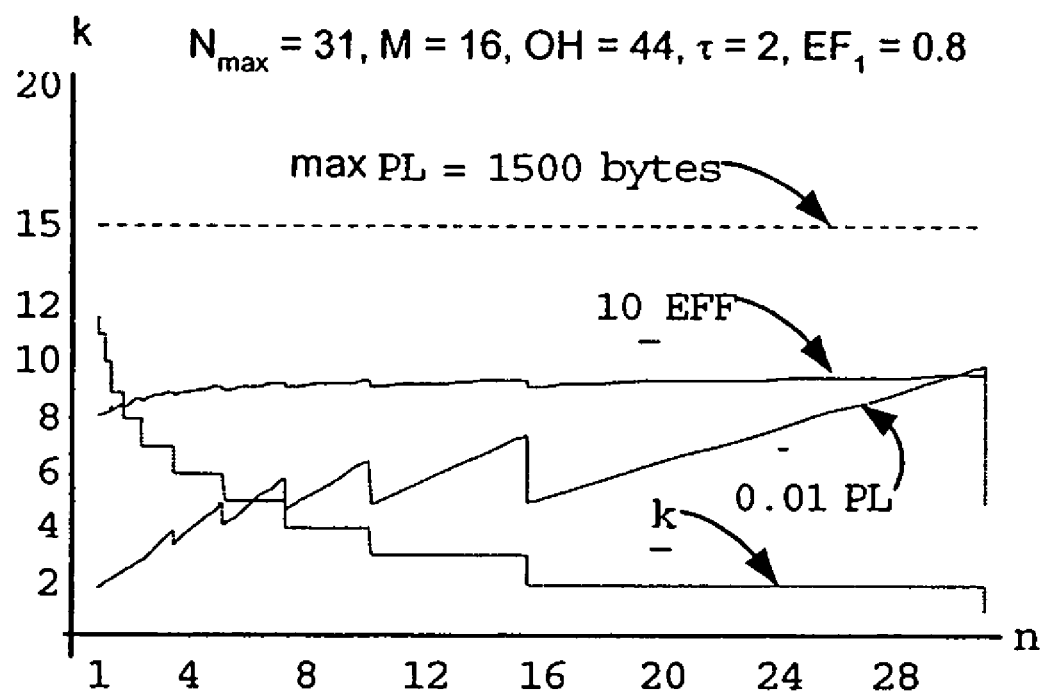
FIG. 8 plots the parameters k, PL and EFF vs. n with the efficiency floor EF1=0.8.

FIG. 8 also plots the parameters k, PL and EFF vs. n, as derived from equation (7), with the same scaling that was used for FIG. 7. FIG. 8 plots the parameters k, PL and EFF vs. n with the efficiency floor EF1=0.8, and all other parameters the same as for FIG. 7. Comparing FIG. 7 to FIG. 8 therefore shows how the parameters k, PL and EFF vary with respect to n for different minimum efficiencies.

Figure 9:
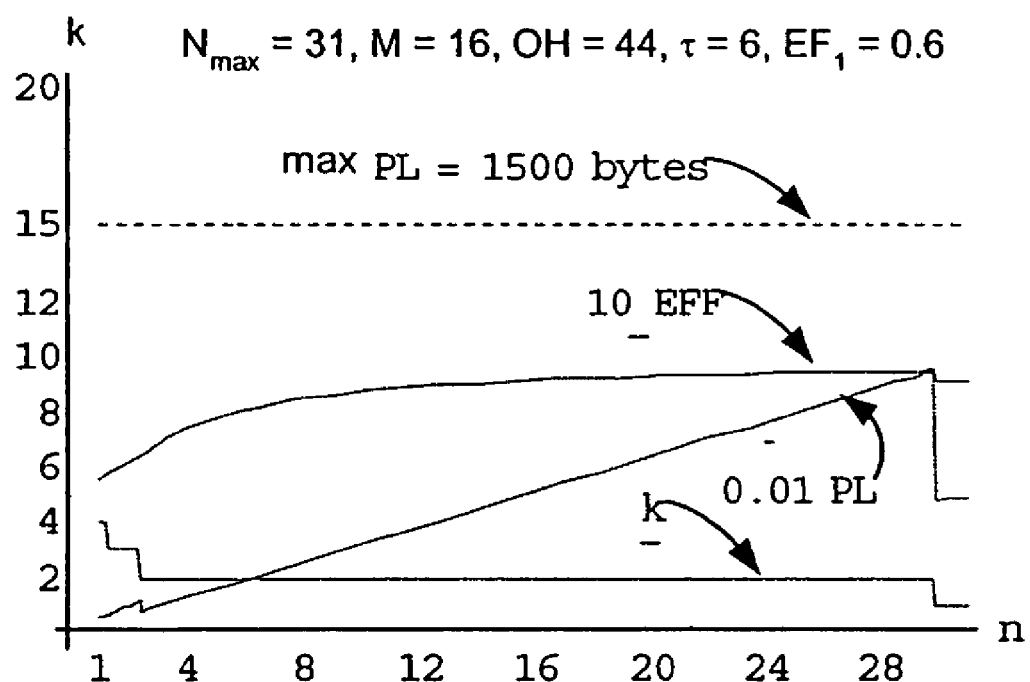
FIG. 9 plots the parameters k, PL and EFF vs. n with $\tau$=6, and all other parameters the same as for FIG. 7; and, FIG. 10 shows the parameter k, the number of multiframes encapsulated in an RTP packet according to the present invention, in tabular form.
Figure 11:
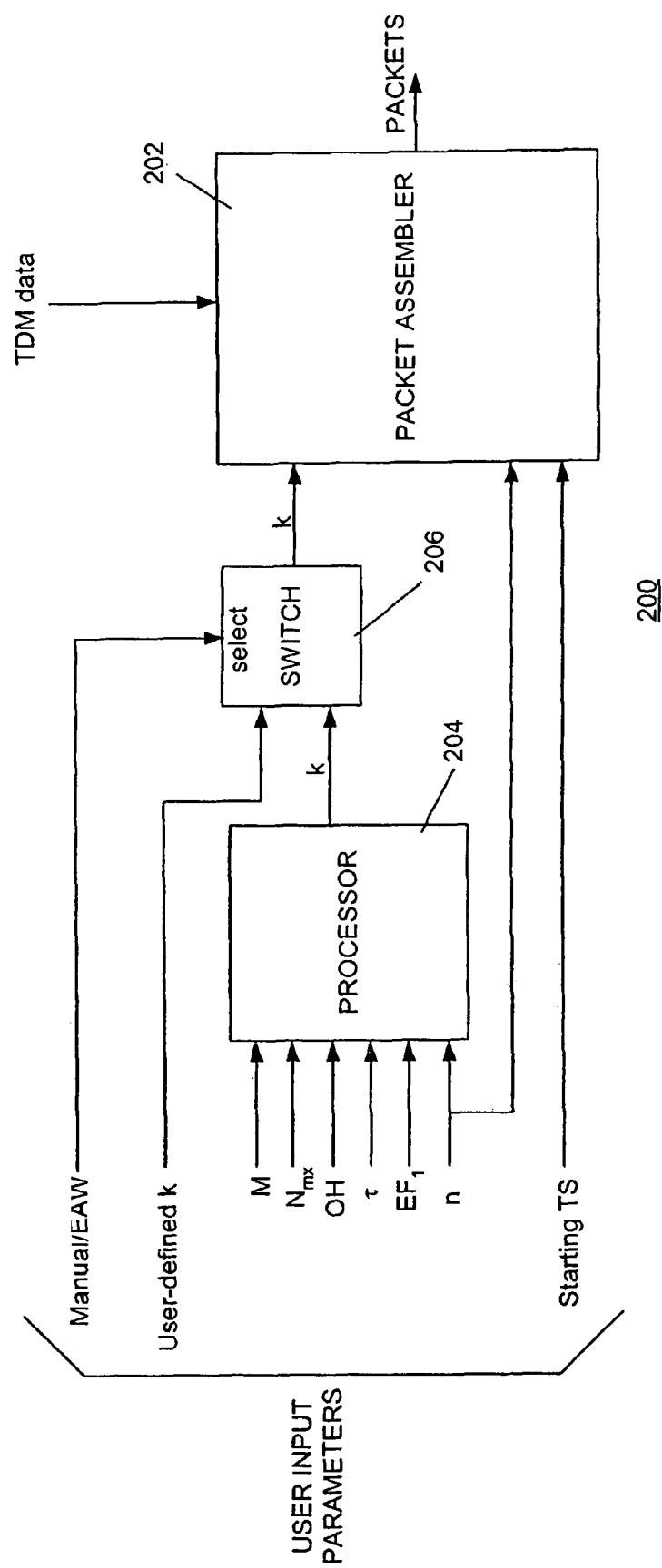
FIG. 11 is a block diagram showing an embodiment of a system according to the present invention.

FIG. 9 plots the parameters k, PL and EFF vs. n with $\tau$=6, and all other parameters the same as for FIG. 7. Comparing FIG. 7 to FIG. 9 therefore shows the effect that $\tau$ has on convergence of the parameters k, PL and EFF.

FIG. 10 shows a selection of parameters produced from equation (7) in tabular form (i.e., a "lookup table") for E1 over IP/UDP/RTP with minimum efficiency of 90%, 80% and 70%, and parameters of $N_{max}$=31, M=16, OH=44, and $\tau$=2. The lookup table of FIG. 10 may be used to provide a suitable operating point for the packet protocol (i.e., a particular value of k with respect to n) given a desired efficiency EF and efficiency floor $E_1$.

One embodiment of a system 200 for implementing the EWA according to equation (7) (i.e., for selecting a value of k so as to exponentially weight the packet efficiency) is shown in block diagram form in FIG. 1. The system 200 includes a packet assembler 202, a processor 204, and switch 206. The packet assembler 202 receives TDM data for encapsulation in packets. The processor 204 receives user input parameters 208 (e.g., maximum time-slots per frame Nmx, overhead size OH, frames per signaling multiframe M, minimum efficiency EF1, time constant $\tau$, number of time-slots associated with the TDM data n, et al.) to the processor 204. The processor 204 calculates a value of the parameter k as a function of the user input parameters 208. The processor 204 passes the parameter k, through the switch 206, to the packet assembler. Each possible value of k that the processor 204 generates corresponds to one value of the number of time-slots n in the TDM data, such that the efficiency of the data packet increases exponentially as the number of time-slots in the TDM data increases. Thus, the processor 204 provides values of k for different values of n to the packet assembler 202, according the EWA as described herein, and the packet assembler 202 compiles packets with desired efficiencies, according to the EWA. The user can also provide a "manual" setting of k to the packet assembler 202 via the switch 206, so as to bypass the EWA. To manually select k, the user provides a manual k value to the switch 206 and provides an appropriate control signal 208 to the switch so that the manual value of k is presented to the packet assembler 202, rather than the k generated by the EWA.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of encapsulating data into individual data packets for transmission across a packet network, comprising:
    delineating Time Division Multiplex (TDM) data into one or more signaling multiframes, wherein each signaling multiframe includes one period of a periodic signaling pattern;
    appending a header associated with the individual data packets to each of the one or more signaling multiframes of TDM data; and
    appending a modified RTP header to each of the one or more signaling multiframes;
    wherein an efficiency of the individual data packets increases as a number of time-slots in the TDM data increases.

2. The method according to claim 1, further comprising delineating the TDM data such that a first byte in the one or more signaling multiframes is directly adjacent to the header.

3. The method according to claim 1, further comprising extracting the TDM data from one or more time-slots from a TDM data stream.

4. A data packet constructed and arranged to encapsulate data for transmission over a packet network, comprising:
    a segment of the Time Division Multiplex (TDM) data from one or more TDM time-slots, wherein the segment of the TDM data corresponds to a signaling multiframe of the TDM data including one period of a periodic signaling pattern; and
    a header associated with the data packet appended to the segment of the TDM data, wherein the header includes an RTP header including an extended RTP header having data associated with a starting time-slot, a number of time-slots per frame, and a number of multiframes in the data packet;
    wherein an efficiency of the data packet increases as the number of TDM time-slots in the TDM data increases.

5. The data packet according to claim 4, wherein the TDM data includes T1 data.

6. The data packet according to claim 4, wherein the TDM data includes E1 data.

7. The data packet according to claim 4, wherein the segment of TDM data is delineated such that a first byte in the signaling multiframe is directly adjacent to the header.

8. The data packet according to claim 4, wherein the signaling multiframe corresponds to a multiframe associated with the TDM data.

9. The data packet according to claim 8, wherein the multiframe includes 16 frames for E1 data.

10. The data packet according to claim 8, wherein the multiframe includes 24 frames for T1 data.

11. A system for encapsulating Time Division Multiplex (TDM) data in a packet, comprising:
 a processor configured to receive information and calculate a parameter containing TDM data based on the information;
 a switch configured to receive the parameter from the processor via a communications path; and
 a packet assembler configured to receive the parameter from the switch and encapsulate the TDM data within a packet;
 wherein the information is selected from a group consisting of maximum time slots for a frame, an overhead size, a plurality of frames for signaling multiframes, a minimum efficiency, a time constant, a number of time-slots associated with the TDM data, and other relevant data information; and
 wherein the parameter includes a number of time-slots in the TDM data so an efficiency of the packet increases as the number of time-slots in the TDM data increases.

12. The system of claim 11 wherein the processor is configured to use an Exponential Weighting Algorithm.

13. The system of claim 11 wherein the switch is configured to receive a manual setting to bypass an Exponential Weighting Algorithm.

14. The method according to claim 1, wherein the efficiency of the individual data packets increases exponentially as the number of time-slots in the TDM data increases.

15. The method according to claim 1, wherein the efficiency of the individual data packets is increased by selecting a number of the one or more signaling multiframes such that the efficiency of the individual data packets increases exponentially as the number of time-slots in the TDM data increases.

16. The method according to claim 1, wherein the modified RTP header is an extended RTP header having data associated with a starting time-slot, a number of time-slots per frame, and a number of multiframes in the data packet.

17. The data packet according to claim 4, wherein the efficiency of the data packet increases exponentially as the number of time-slots in the TDM data increases.

18. The packet according to claim 4, wherein the efficiency of the data packet is increased by selecting a number of the plurality of frames for signaling multiframes such that the efficiency of the data packet increases exponentially as the number of time-slots in the TDM data increases.

19. The system of claim 11 wherein the parameter includes a number of time-slots in the TDM data so an efficiency of the packet increases exponentially as the number of time-slots in the TDM data increases.

20. The system of claim 11 wherein the efficiency of the data packet is increased by selecting a number of the plurality of frames for signaling multiframes such that the efficiency of the data packet increases exponentially as a number of time-slots in the TDM data increases.

\* \* \* \* \*

UNITED STATES PATENT AND TRADEMARK OFFICE
CERTIFICATE OF CORRECTION

PATENT NO. : 8,189,553 B2  Page 1 of 1
APPLICATION NO. : 11/803300
DATED : May 29, 2012
INVENTOR(S) : Jeffrey S. Pattavina and Junius A. Kim It is certified that error appears in the above-identified patent and that said Letters Patent is hereby corrected as shown below:

Title page,

(74) Attorney, Agent, or Firm - Greenberg Traurig, LLP; David J. Dkyeman; Wayne V. Harper Delete "Dkyeman"
Insert --Dykeman--.

Signed and Sealed this
Twenty-fourth Day of July, 2012

David J. Kappos
*Director of the United States Patent and Trademark Office*